United States Patent
Norimatsu et al.

(10) Patent No.: US 8,527,733 B2
(45) Date of Patent: Sep. 3, 2013

(54) MEMORY SYSTEM

(75) Inventors: Seiji Norimatsu, Kanagawa (JP); Nobuhiro Ono, Kanagawa (JP); Hirokuni Yano, Tokyo (JP); Yasunori Nakamura, Kanagawa (JP); Shoji Ninoi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 168 days.

(21) Appl. No.: 13/238,675

(22) Filed: Sep. 21, 2011

(65) Prior Publication Data
US 2012/0159046 A1 Jun. 21, 2012

(30) Foreign Application Priority Data
Dec. 15, 2010 (JP) ................. 2010-279362

(51) Int. Cl.
*G06F 13/00* (2006.01)
*G06F 13/28* (2006.01)

(52) U.S. Cl.
USPC .............. 711/202; 711/103; 711/E12.058

(58) Field of Classification Search
USPC .................. 711/202, 103, E12.058
See application file for complete search history.

(56) References Cited

U.S. PATENT DOCUMENTS

| | | |
|---|---|---|
| 7,418,705 B2 | 8/2008 | Kanai et al. |
| 7,953,920 B2 | 5/2011 | Yano et al. |
| 7,958,411 B2 | 6/2011 | Kanno et al. |
| 7,962,688 B2 | 6/2011 | Yano et al. |
| 8,015,347 B2 | 9/2011 | Kitsunai et al. |
| 2010/0037009 A1 | 2/2010 | Yano et al. |
| 2010/0037011 A1 | 2/2010 | Yano et al. |
| 2010/0138591 A1* | 6/2010 | Yano et al. ............ 711/103 |
| 2010/0153626 A1 | 6/2010 | Yano et al. |
| 2010/0161885 A1 | 6/2010 | Kanno et al. |
| 2010/0169549 A1 | 7/2010 | Yano et al. |
| 2010/0169551 A1 | 7/2010 | Yano et al. |
| 2010/0169553 A1 | 7/2010 | Yano et al. |
| 2010/0169597 A1 | 7/2010 | Yonezawa et al. |
| 2010/0223424 A1 | 9/2010 | Kitsunai et al. |
| 2010/0299494 A1* | 11/2010 | Van Acht et al. ........... 711/166 |
| 2010/0313084 A1 | 12/2010 | Hida et al. |

(Continued)

FOREIGN PATENT DOCUMENTS

| | | |
|---|---|---|
| JP | 5-282888 | 10/1993 |
| JP | 2009-211202 | 9/2009 |
| JP | 2010-157139 | 7/2010 |

OTHER PUBLICATIONS

U.S. Appl. No. 13/052,146, filed Mar. 21, 2011, Naoki Ootsuka, et al.

(Continued)

*Primary Examiner* — Edward Dudek, Jr.
(74) *Attorney, Agent, or Firm* — Oblon, Spivak, McClelland, Maier & Neustadt, L.L.P.

(57) ABSTRACT

According to one embodiment, a memory system includes a controller for controlling a data transfer between a nonvolatile memory and a host device. The controller writes, to the nonvolatile memory, management information to be used in the data transfer, a multiplexed pointer indicating a storage position, and a log indicating whether the writing of the pointer is successful, determines whether the multiplexing the pointer by the predetermined number is maintained according to at least one of the pointer and the log, and rewrites the multiplexed pointers to the nonvolatile memory when determining that the multiplexing the pointer by the predetermined number is not maintained.

20 Claims, 13 Drawing Sheets

(56) References Cited

U.S. PATENT DOCUMENTS

2011/0173380 A1 7/2011 Yano et al.
2011/0185106 A1 7/2011 Yano et al.
2011/0307651 A1* 12/2011 Wong .......................... 711/103

OTHER PUBLICATIONS

U.S. Appl. No. 13/063,210, filed May 25, 2011, Hirokuni Yano, et al.

* cited by examiner

FIG.4A

| POSITION (OFFSET) FROM HEAD OF INFORMATION | CONTENT OF INFORMATION |
|---|---|
| 0 | POINTER/LOG DISCRIMINATION FLAG |
| 1 | SEQUENCE NUMBER |
| 2 | POINTER TO MANAGEMENT INFORMATION |

POINTER

FIG.4B

| POSITION (OFFSET) FROM HEAD OF INFORMATION | CONTENT OF INFORMATION |
|---|---|
| 0 | POINTER/LOG DISCRIMINATION FLAG |
| 1 | SEQUENCE NUMBER |
| 2 | SUCCESS OR FAILURE OF PAGE WRITE TO BLOCK 0 |
| 3 | SUCCESS OR FAILURE OF PAGE WRITE TO BLOCK 1 |
| ⋮ | ⋮ |

LOG

| SEQUENCE NUMBER OF POINTER = SEQUENCE NUMBER OF LOG? | Lane POSITION OF POINTER | RECOVERY PROCESSING | |
|---|---|---|---|
| YES | Lane 0 (BLOCK 0 or 1) | UNNECESSARY | ~D1 |
| | Lane 1 (BLOCK 2 or 3) | RECOVERY PROCESSING INTENDED FOR Lane 0 | ~D2 |
| NO (LOG INFORMATION IS OLDER) | Lane 0 (BLOCK 0 or 1) | RECOVERY PROCESSING INTENDED FOR Lane 1 | ~D3 |
| | Lane 1 (BLOCK 2 or 3) | RECOVERY PROCESSING INTENDED FOR Lane 0 | ~D4 |

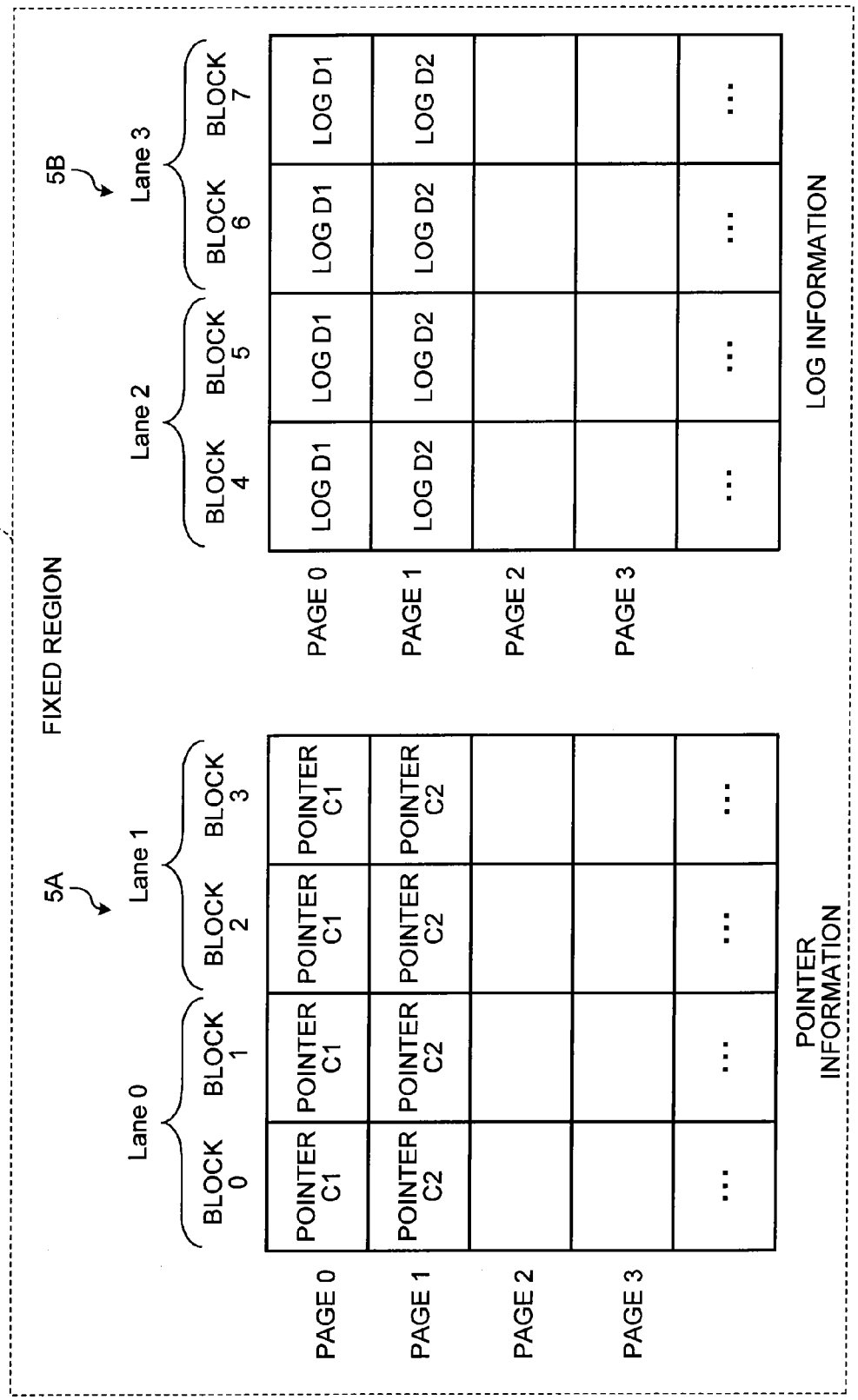

| POSITION (OFFSET) FROM HEAD OF INFORMATION | CONTENT OF INFORMATION |
|---|---|
| 0 | SEQUENCE NUMBER |
| 1 | POINTER TO MANAGEMENT INFORMATION |

POINTER

| POSITION (OFFSET) FROM HEAD OF INFORMATION | CONTENT OF INFORMATION |
|---|---|
| 0 | SEQUENCE NUMBER |
| 1 | SUCCESS OR FAILURE OF PAGE WRITE TO BLOCK 0 |
| 2 | SUCCESS OR FAILURE OF PAGE WRITE TO BLOCK 1 |
| ⋮ | ⋮ |

LOG

MEMORY SYSTEM

CROSS-REFERENCE TO RELATED APPLICATIONS

This application is based upon and claims the benefit of priority from Japanese Patent Application No. 2010-279362, filed on Dec. 15, 2010; the entire contents of which are incorporated herein by reference.

FIELD

Embodiments described herein relate generally to a memory system.

BACKGROUND

In recent years, an increase in a capacity of an NAND type flash memory to be a nonvolatile semiconductor storage device progresses and attention is paid to an SSD (Solid State Drive) serving as a memory system provided with the NAND type flash memory. In the memory system, it is desired to enhance a reliability of data storage.

BRIEF DESCRIPTION OF THE DRAWINGS

FIGS. 4A and 4B are tables illustrating a content of a pointer and a content of a log according to the first embodiment;

FIG. 9 is a diagram illustrating an example of structures of the pointer information and the log information according to the second embodiment;

FIGS. 10A and 10B are tables illustrating a content of a pointer and a content of a log according to the second embodiment;

DETAILED DESCRIPTION

In general, according to one embodiment, a memory system includes a nonvolatile memory and a controller for controlling a data transfer between the nonvolatile memory and a host device. The controller writes, to the nonvolatile memory, management information indicating relationships between logical addresses designated by the host device and physical addresses in the nonvolatile memory. Moreover, the controller writes to the nonvolatile memory a pointer indicating a storage position of the management information. Furthermore, the controller writes, to the nonvolatile memory, a log indicating whether the writing of the pointer is successful. In addition, the controller multiplexes the pointer by a predetermined number and writes the multiplexed pointers to the nonvolatile memory. Moreover, the controller determines whether the multiplexing the pointer by the predetermined number is maintained according to at least one of the pointer and the log. Furthermore, the controller rewrites the multiplexed pointers to the nonvolatile memory when determining that the multiplexing the pointer by the predetermined number is not maintained.

A memory system and a recovery processing method according to the embodiments will be described below in detail with reference to the accompanying drawings. The present invention is not limited to the following embodiments.

First Embodiment

Figure 1:
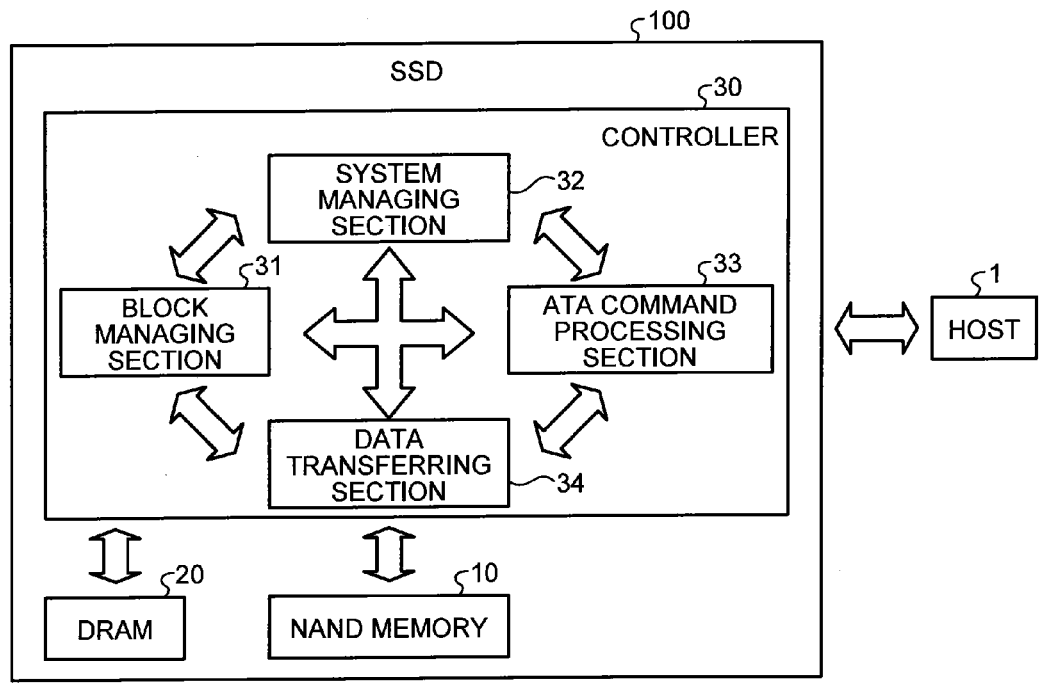
FIG. 1 is a block diagram illustrating an example of a structure of an SSD.

FIG. 1 is a block diagram illustrating an example of a structure of an SSD. An SSD (Solid State Drive) 100 according to an example of a semiconductor storage device using an NAND type flash memory (which will be hereinafter referred to as an NAND memory) 10 is applied to a memory system or the like. The SSD 100 according to the present embodiment multiplexes (for example, duplicate or quadruplicate) and stores, in the NAND memory 10, important data (management information) to be saved in a nonvolatile condition and information (pointer and log information 4 which will be described below, or the like) about a pointer indicative of a position in which the management information is to be stored in order to ensure a reliability. In this embodiment, the term "multiplexing" means to make multiple data items each having the identical information. For example, the term "duplicating" means to make two data items each having the identical information, and the term "quadruplicating" means to make data items each having the identical information and so on.

The management information to be saved in the NAND memory 10 has a snap shot to be a content of a nonvolatile table on a certain point of time and a log(a log 220 for a snap shot which will be described below) to be differential information between a nonvolatile table having a content changed if any and a snap shot (a snap shot 210 which will be described below).

Moreover, the pointer and log information 4 to be saved in the NAND memory 10 has a pointer indicative of a position in which the management information is to be stored in the NAND memory 10, and a log indicating whether the pointer is written accurately or not. The pointer is information for giving access to a place in which the management information is saved. Furthermore, the log is a processing record (a log of the pointer) indicating whether a write (an update) of the pointer is carried out successfully or not. In the present embodiment, the pointer and the log are multiplexed and saved in the NAND memory 10.

In the case in which any of the multiplexed pointers cannot be read due to a fault of a block or the like when the memory system is started, the pointer which cannot be read is rewritten to maintain the multiplexing of the pointer. In the present embodiment, a processing of rewriting the pointer which cannot be read is referred to as a recovery processing. In the present embodiment, the log is stored together with the pointer. Thus, the log is used to carry out the recovery processing. Consequently, the recovery processing can be carried out efficiently. In the recovery processing, a processing of rewriting the log is also carried out after the processing of rewriting the pointer.

The SSD 100 is connected to a host device (which will be hereinafter referred to as a host) 1 such as a personal computer or a CPU core through a host I/F (not illustrated) to be a memory connecting interface such as an ATA interface (ATA I/F), and functions as an external memory of the host 1.

The SSD 100 is used as a secondary storage device of the host 1 and has a function for storing data for which a writing request is given from the host 1, and reading data for which a reading request is given from the host 1 and outputting the data to the host 1.

The SSD 100 includes a DRAM 20 serving as a volatile semiconductor memory, a controller 30 for carrying out a data management or the like, and an NAND memory 10 serving as a nonvolatile semiconductor memory.

The NAND memory 10 has a plurality of NAND memory chips. Each of the NAND memory chips has a plurality of blocks which will be described below. Moreover, the respective NAND memory chips are connected to the controller 30 in parallel with each other through a channel. The number of the NAND memories to be connected to a single channel is not restricted to one but a plurality of NAND memories may be connected in such a condition as to share an input/output line.

Each NAND memory chip of the NAND memory 10 can carry out a parallel operation through a plurality of channels and an interleave operation through a plurality of Lanes, for example. In the present embodiment, description will be given to the case in which data are written in parallel to the block contained in the NAND memory connected to two channels (one of the Lanes) capable of carrying out the parallel operation. It is assumed that the respective blocks are disposed in the different NAND memory chips in order to enhance a multiplexing effect. In the present embodiment, there is assumed the case in which the Lane is constituted by a plurality of (for example, two) channels to write data in parallel, thereby performing the interleave operation between the Lanes. However, it is also possible to employ a structure in which all of the channels carry out the parallel operation.

The NAND memory 10 requires an erase before writing data. In the NAND memory 10, moreover, an erasing unit and a writing unit are different from each other. In the NAND memory 10, for example, the erasing unit is a block unit and the writing unit is a page unit. A single block is constituted by a plurality of pages. Moreover, the NAND memory 10 is defined to cause writing order to be continuous. In other words, referring to write, overwrite to the page cannot be carried out but it is defined to perform an append and read-multiple operation in ascending order every page.

The DRAM 20 functions as a cache for a data transfer, a memory for a work area or the like between the host 1 and the NAND memory 10. A management table, a log on a DRAM, the pointer and log information 4, user data and the like are stored in the memory for a work area in the DRAM 20.

The management table is a master table in which the management information stored in the NAND memory 10 is expanded in a during power-on sequence (starting operation) or the like (a snap shot 210 reflecting a log 220 for the snap shot). The management table is an information table for managing the management information for causing a logical address specified by the host 1 to correspond to a storage position (physical addresses) of physical data in the NAND memory 10.

The log on the DRAM is the same data as the log 220 for the snap shot which is stored in the NAND memory 10 and is a change difference of the management table. When user data are to be written or data are to be read/written from/to the management table, the management table is expanded onto the DRAM 20. In the case in which the user data stored in the NAND memory 10 are updated, update data are written to a different page from a page on which data are originally stored. As a result, relationships between the logical address and the physical address is changed. Information about the change (a change difference) in the relationships is managed as a DRAM log.

The log on the DRAM to be the change difference of the management table is once saved on the DRAM 20 when a user data writing or saving destination block is changed. When the log on the DRAM is stored in a certain amount, however, it is written as the log 220 for the snap shot to the NAND memory 10. In other words, the SSD 100 reflects the DRAM log on the management table in a predetermined timing while the SSD 100 is operated, and furthermore, saves the DRAM log as the log 220 for a snap shot in the NAND memory 10. Moreover, the SSD 100 saves the management table as the snap shot 210 in the NAND memory 10 in a predetermined timing while the SSD 100 is operated.

More specifically, each log data to be the log on the DRAM are stored to be arranged in time series in order over the DRAM 20. When the update of the data is stabilized, the log on the DRAM is written as the log 220 for the snap shot to the NAND memory 10. In the NAND memory 10, the log 220 for the snap shot is stored to be arranged in time series in order. When the snap shot is completed to be saved in the NAND memory 10, then, the log 220 for the snap shot written to the NAND memory 10 is not required before the management table is saved.

In place of the DRAM 20, it is also possible to use an FeRAM (Ferroelectric Random Access Memory), an MRAM (Magnetoresistive Random Access Memory), a PRAM (Phase change Random Access Memory) or the like. In place of the DRAM 20, moreover, it is also possible to use an SRAM (Static Random Access Memory). In this case, the SRAM may be mixed into the controller 30. If a capacity of the SRAM mixed into the controller 30 is sufficiently large, it is not necessary to provide a volatile or nonvolatile random access memory on an outside of the controller.

The controller 30 to be a data managing section carries out a data transfer control through the DRAM 20 between the host 1 and the NAND memory 10. Moreover, the controller 30 decides whether data are successfully erased, written, read or multiplexed in the NAND memory 10. The controller 30 according to the present embodiment has a function for writing data to the NAND memory 10 in parallel.

The controller 30 has a block managing section 31, a system managing section 32, an ATA command processing section 33 and a data transferring section 34. The block managing section 31 manages each block in the NAND memory 10. The block managing section 31 according to the present embodiment gives a request for updating the pointer to the system managing section 32 when a position in which the management information is to be stored is updated. Moreover, the block managing section 31 updates a log (append to read-multiple over the NAND memory 10) and gives a recovery request to the system managing section 32 in a subsequent system during power-on sequence upon receipt of a result of the pointer update processing from the system managing section 32.

The system managing section 32 executes the update of the pointer and the recovery processing. The system managing section 32 executes the processing of updating the pointer upon receipt of a request for updating the pointer from the block managing section 31 and transmits the result of the update processing to the block managing section 31 after the management information is completely rebuilt through the block managing section 31. The system managing section 32 obtains the log from the block managing section 31 in the subsequent system during power-on sequence, and furthermore, carries out the recovery processing of the pointer by using the log.

The ATA command processing section 33 carries out a command interface with the host 1. The data transferring section 34 carries out a data interface (a data transfer) between the NAND memory 10 and the host 1 through the DRAM 20.

Moreover, the controller 30 transfers, as the management table, the management information stored in the NAND memory 10 to the DRAM 20 in the system during power-on sequence. When an event to update the management information is generated, moreover, the controller 30 stores differential information before and after the update of the management table stored in the DRAM 20 as the log on the DRAM in the DRAM 20. Furthermore, the controller 30 sequentially stores, in append to read-multiple, the log on the DRAM in the NAND memory 10 when a predetermined condition is established, and furthermore, reflects the content of the log on the DRAM on the management table stored in the DRAM 20.

In addition, the controller 30 according to the present embodiment stores a pointer indicative of a storage position for the management information in the NAND memory 10 and a log of the pointer as the pointer and log information 4 in the NAND memory 10. The pointer is to be updated when the management information is updated so that the saving place is changed. In the update, a new pointer is written to another page based on a characteristic of the NAND memory 10. Moreover, there is a possibility that the update processing might not be normally completed due to a disconnection of a system power supply in the middle of the update or a fault in the page write of the NAND memory 10. In the update, therefore, the log of the pointer is also saved in the NAND memory 10 at the same time. Consequently, setting is carried out to decide whether the update processing is normally carried out or not based on the pointer and the log in the subsequent system during power-on sequence.

In an NAND type flash memory or the like, there is a tendency that a defective rate is increased due to a deterioration caused by an increase in the number of Write/Erase operations for data, a deterioration caused by a repetition of Read, an aged deterioration or the like. For this reason, in some cases, a data contamination is posteriori caused even if data are successfully written in a writing operation. In some cases, moreover, an irregular power disconnection is caused during data writing. Also in these cases, it is desired to maintain the multiplexing of the pointer or the log in order to enhance a reliability of the system. In the present embodiment, therefore, the recovery processing is carried out when any of the multiplexed pointers cannot be read in the system during power-on sequence (when the update processing is not carried out accurately). Consequently, the reliability of the SSD 100 can be improved.

Therefore, the pointer and log information 4 is saved in the NAND memory 10 in a format of the whole pointer at a certain point of time and the log at a point of time that the pointer is saved. When a condition for updating the pointer is established, the pointer is stored in the NAND memory 10 and a log indicating whether the pointer is successfully stored or not is then stored in the NAND memory 10.

Figure 2:
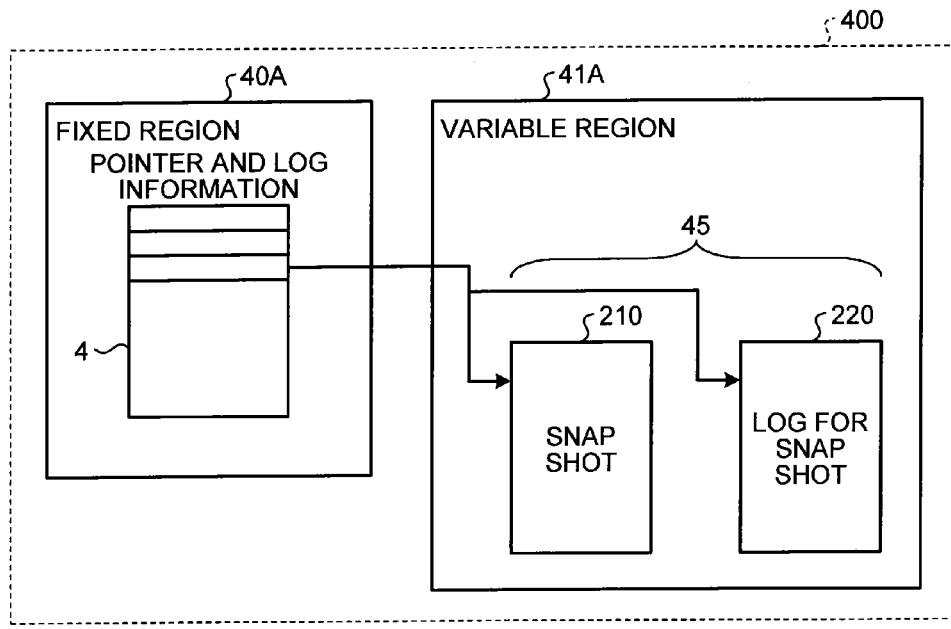
FIG. 2 is a diagram schematically illustrating positions in which management information and pointer and log information are to be stored according to a first embodiment.

FIG. 2 is a diagram schematically illustrating the positions in which the management information and the pointer and log information are to be stored according to the first embodiment. In the NAND memory 10, a management information saving region 400 in which the management information 45 and the pointer and log information 4 are saved has a fixed region 40A and a variable region 41A.

The fixed region 40A is constituted by a statically ensured block and the variable region 41A is constituted by a dynamically ensured block. The pointer and log information 4 is stored in the fixed region 40A. Since the pointer and log information 4 is required to be information which can be fixedly referred to during power-on sequence of the memory system, it is stored in the fixed region 40A constituted by the statically assigned block. Moreover, the management information 45 is stored in the variable region 41A. The management information 45 has a snap shot 210 and a log 220 for the snap shot.

The fixed region 40A has a fixed relationships between a logical block and a physical block in the NAND memory 10, and has a low updating frequency in which rewrite or write is rarely generated. For this reason, the fixed region 40A is used as a region in which necessary information for operating the memory system is to be stored. For example, the fixed region 40A is set in such a manner that data are not written to other blocks in the fixed region 40A but the data in the block are erased and writing is then performed from a head page of the erased block if all of the blocks which are being written are satisfied.

The variable region 41A has the relationships between the logical block and the physical block which is varied in the region of the NAND memory 10 excluding the fixed region 40A. For example, the variable region 41A is set in such a manner that next information is written to other blocks to be writable free blocks in the variable region 41A if all of the blocks which are being written are satisfied. In the variable region 41A, the fixed region 40A in the NAND memory 10 is excluded as described above, and a data storage region for storing data required to be written from the host 1 is also included in addition to the region in which the management information 45 is to be stored. In other words, the physical region in the NAND memory 10 excluding the fixed region 40A is set to be the variable region 41A. Herein, the data storage region and the region in which the management information is to be stored are functionally separated from each other.

A predetermined position in the fixed region 40A (the position in which the pointer and log information 4 is to be stored) is saved as a position to be accessed in the system during power-on sequence in the block managing section 31. In the system during power-on sequence, the block managing section 31 accesses the pointer and log information 4 and thus acquires the pointer and log information 4.

Also in the case in which the NAND memory 10 is constituted by a multivalued memory, it is desirable that the fixed region 40A should be used in a binary mode in order to enhance the reliability of the data of the pointer and log information 4.

Figure 3:
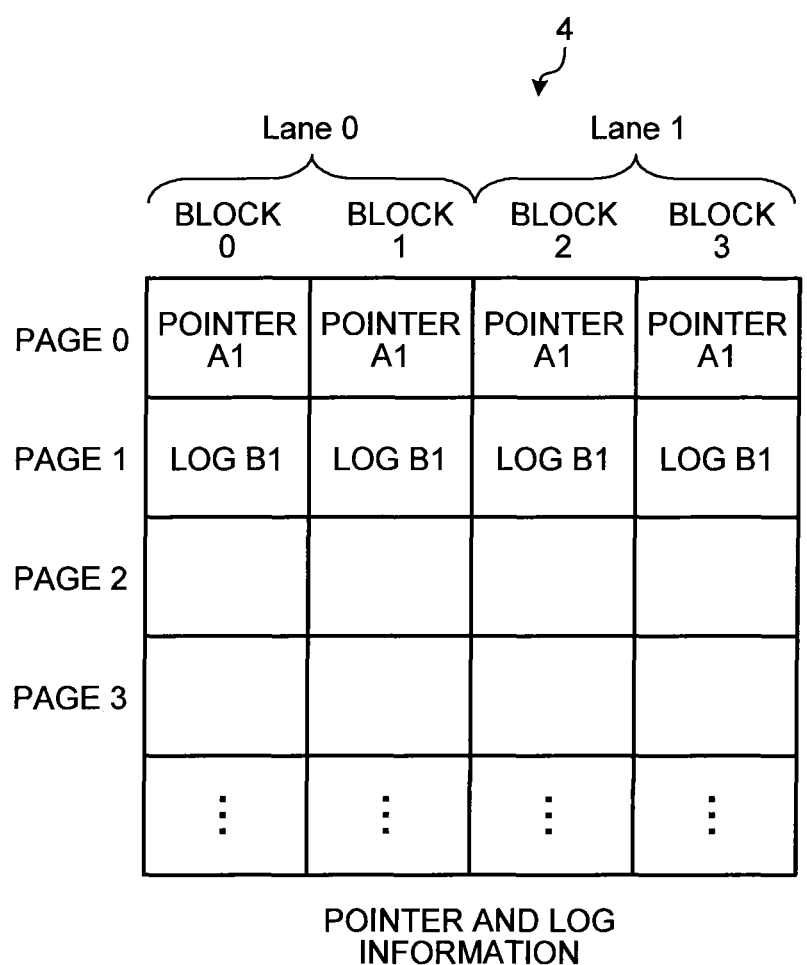
FIG. 3 is a diagram illustrating an example of a structure of the pointer and log information according to the first embodiment.

Next, description will be given to a method of saving the pointer and log information 4. FIG. 3 is a diagram illustrating an example of a structure of the pointer and log information according to the first embodiment. With reference to FIG. 3, description will be given to the case in which the pointer and log information 4 is saved in the fixed region 40A by using a Lane 0 constituted by blocks 0 and 1 and a Lane 1 constituted by blocks 2 and 3.

Referring to the pointer and log information 4, in the case in which the fault of the NAND memory 10 fails in read, the system cannot be started. Therefore, the same pointer A1 is copied and saved in a plurality of blocks (the blocks 0 to 3) as illustrated in FIG. 3. Consequently, the pointer A1 is set to be readable from the other blocks also in the case in which a single block has a fault. More specifically, the pointer A1 is saved in the same number of page (same page position) of the blocks 0 to 3 to multiplex the pointer A1.

Similarly, the same log B1 is copied and saved in the blocks (the blocks 0 to 3). Consequently, the log B1 is set to be readable from the other blocks also in the case in which a single block has a fault. More specifically, the log B1 is saved on the same number of page of the blocks 0 to 3 to multiplex the log B1.

In the present embodiment, the pointer A1 and the log B1 are saved in the same block. For example, the pointer A1 is saved in a page 0 of the block 0 and the log B1 is saved in a page 1 of the block 0. Similarly, the pointer A1 is saved in each of the pages 0 of the blocks 1 to 3 and the log B1 is saved in each of the pages 1 of the blocks 1 to 3. In other words, the log is also included and stored in the region in which the pointer is to be stored in the NAND memory 10. Consequently, either the pointer or the log is saved in each of the pages.

Referring to the pointer and log information 4, the pointer A1 is saved in a first page (for example, the page 0) of the blocks 0 to 3, and the log B1 is then saved in a second page (for example, the page 1) to be a next page. A pointer A2 (not illustrated) is saved in a third page (for example, a page 2) to be a next page to the second page and a log B2 (not illustrated) is thereafter saved in a fourth page (for example, a page 3) to be a next page. Referring to the pointer and log information 4, thus, the same pointer or log is written to a page having the same page number in each block in order from a smaller block number. In the pointer and log information 4, consequently, the pointer and the log are saved alternately.

In the case in which the recovery processing is carried out, the pointer is rewritten to a Lane including a block in which the multiplexing is not carried out accurately based on the pointer and the log. For example, in the case in which the pointer A1 that should have been written to the block 0 or the block 1 cannot be read from the block 0 or the block 1, the recovery processing is carried out over the Lane 0 (the blocks 0 and 1).

Next, description will be given to an example of a content of information to be stored in the pointer and an example of a content of information to be stored in the log. FIGS. 4A and 4B are tables illustrating a content of the pointer and a content of the log according to the first embodiment. FIG. 4A illustrates an example of a structure of the pointer and FIG. 4B illustrates an example of a structure of the log.

As illustrated in FIG. 4A, the pointer is constituted in a correspondence of information indicative of a position (an offset position) from a head of information of the pointer and a content of the information. In a position (a head) of "0" from the head of the information, a pointer/log discrimination flag is stored as information for deciding whether the pointer or the log is stored. Herein, the information indicative of the pointer is stored.

Moreover, a sequence number indicating the number of times that the pointer is updated is stored in a position of "1" from the head of the information. For example, in case of the pointer to be stored through an N-th (N is a natural number) update processing after the snap shot 210 is saved, a sequence number indicative of the N-th update is stored. Every time the snap shot 210 is saved, the sequence number may be reset. Moreover, the pointer to the management information 45 (information indicative of a storage position in the NAND memory 10) is stored in a position of "2" from the head of the information.

As illustrated in FIG. 4B, furthermore, the log is constituted in a correspondence of information indicative of a position (an offset position) from a head of information of the log and a content of the information. In the position (the head) of "0" from the head of the information, the pointer/log discrimination flag is stored. Herein, the information indicative of the log is stored.

Moreover, a sequence number indicating the number of times that the log(pointer) is updated is stored in the position of "1" from the head of the information. For example, in case of the log to be stored through an N-th (N is a natural number) update processing after the snap shot 210 is saved, a sequence number indicative of the N-th update is stored. Every time the snap shot 210 is saved, the sequence number may be reset.

In addition, information (write success or failure information) indicating whether page write to each block succeeds or fails is stored in positions after the position of "2" from the head of the information. For example, information indicating whether page write to the block 0 succeeds or fails is stored in the position of "2" from the head of the information. Moreover, information indicating whether page write to the block 1 succeeds or fails is stored in a position of "3" from the head of the information.

Figure 5:
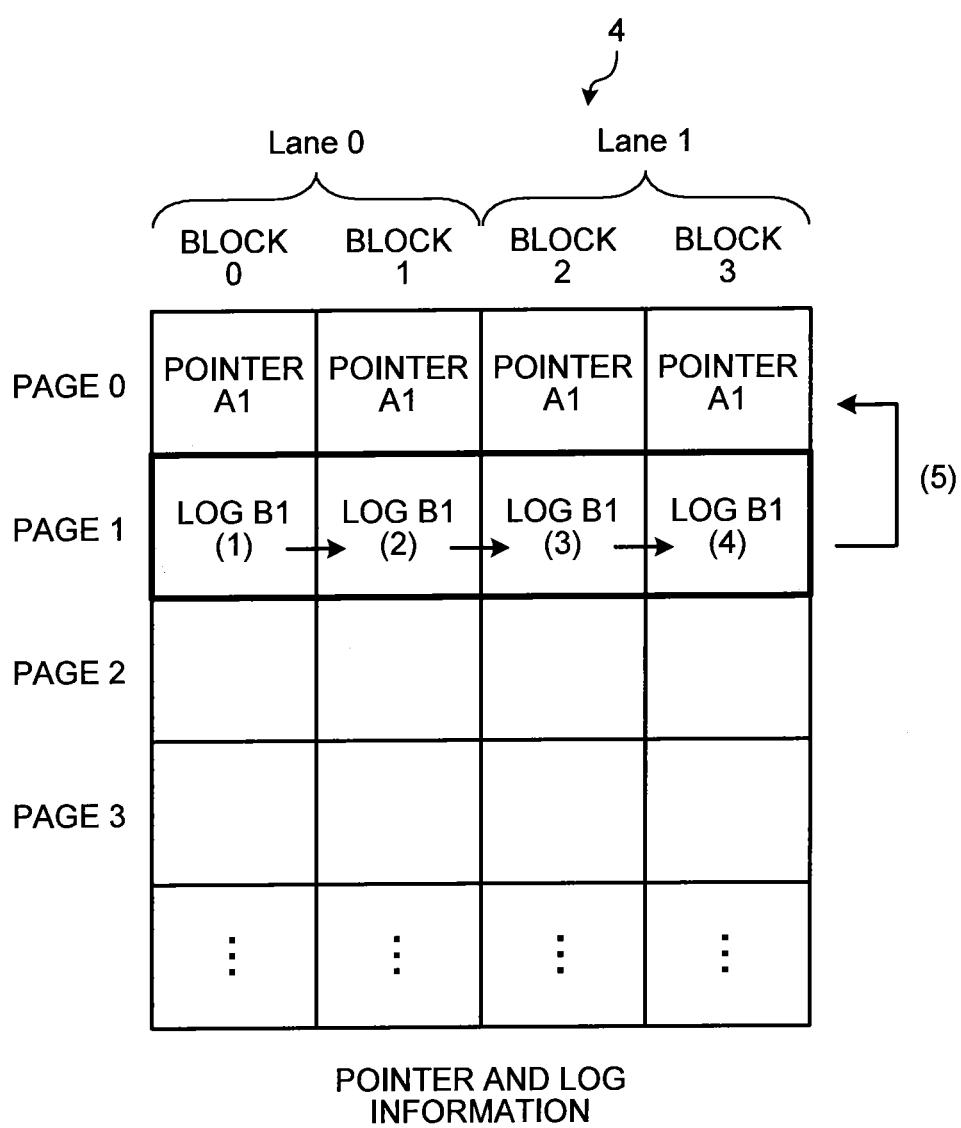
FIG. 5 is a diagram for explaining a procedure for reading the pointer and the log according to the first embodiment.

Next, description will be given to a procedure for reading the pointer and the log. FIG. 5 is a diagram for explaining the procedure for reading the pointer and the log according to the first embodiment. When the pointer or the log is to be read from an inside of the pointer and log information 4, the block managing section 31 extracts the pointer and log information 4 from the inside of the NAND memory 10 and transmits the pointer and log information 4 to the system managing section 32.

The system managing section 32 retrieves a page (the newest page) which is updated finally from the blocks 0 to 3 in the pointer and log information 4. In other words, the system managing section 32 reads data from any of written pages in each block which has the greatest page number. Either the log or the newest pointer is saved in the page.

The system managing section 32 reads a pointer or a log on the newest page in order from a block having a smaller block number until the reading operation succeeds. Herein, data in the page 1 to be the newest page are read in order of the block 0, the block 1, the block 2 and the block 3.

The system managing section 32 reads data from a page having the same page number in the block 1 when the data read from the block 0 fails so that the read cannot be carried out. Subsequently, a processing of performing a movement through the blocks to read the page having the same page number is repeated until the read can be carried out. Thus, the same pointer is written to the page having the same page number in the blocks through multiplexing. Also in the case in which the data cannot be read from pages in a single block, therefore, it is possible to read data from the page having the same page number in the other blocks. Consequently, there is relieved a risk that the system cannot be started.

It is possible to decide whether information thus read is the pointer or the log through the pointer/log discrimination flag. If the read information is the log, it is possible to decide that the pointer is recorded on a page having a smaller number by one.

If the pointer and log information 4 is normally updated, a page written finally is the log information. In case of the pointer and log information 4 illustrated in FIG. 5, the log B1 is read from the page 1 to be the newest page of the block 0 (1). When the read fails, the log B1 is read from the page 1 of the block 1 (2). If the read fails, furthermore, the log B1 is read from the page 1 of the block 2 (3). If the read also fails, the log B1 is read from the page 1 of the block 3 (4).

If the log B1 can be read from any of the blocks 0 to 3, a processing of reading the pointer A1 is carried out. At this time, the system managing section 32 reads write success or failure information for each block which is stored in the block B1. Then, the system managing section 32 reads the pointer from a proper block (a block succeeding in the write of the pointer) by referring to the write success or failure information thus read. At this time, the system managing section 32 reads data (the pointer A1) from a second newest page (the page 0 herein) from the blocks succeeding in the read.

If the system managing section 32 can decide that the write of the pointer A1 to the blocks succeeds based on the write success or failure information, it reads data from the second newest page (the page 0) in the block having the smallest block number in which the write succeeds. If the read fails, a processing of reading the pointer A1 from the page 0 of a next block in ascending order of the block number is repeated until the read succeeds. The system managing section 32 decides the necessity of the recovery processing based on the read log B1 and the read pointer A1.

There is a possibility that the write might be ended before the write of the log is reached due to the disconnection of the system power supply in the middle of the write of the pointer. For this reason, the log is not always read from the newest page.

In the case in which a pointer AN is stored in the newest page, the system managing section 32 reads the pointer AN in the newest page in order from the block having a smaller block number. Furthermore, a log B (N−1) in the second newest page is read from the block having the smaller block number. The system managing section 32 decides the necessity of the recovery processing based on the read log B (N−1) and the read pointer AN.

Figure 6:
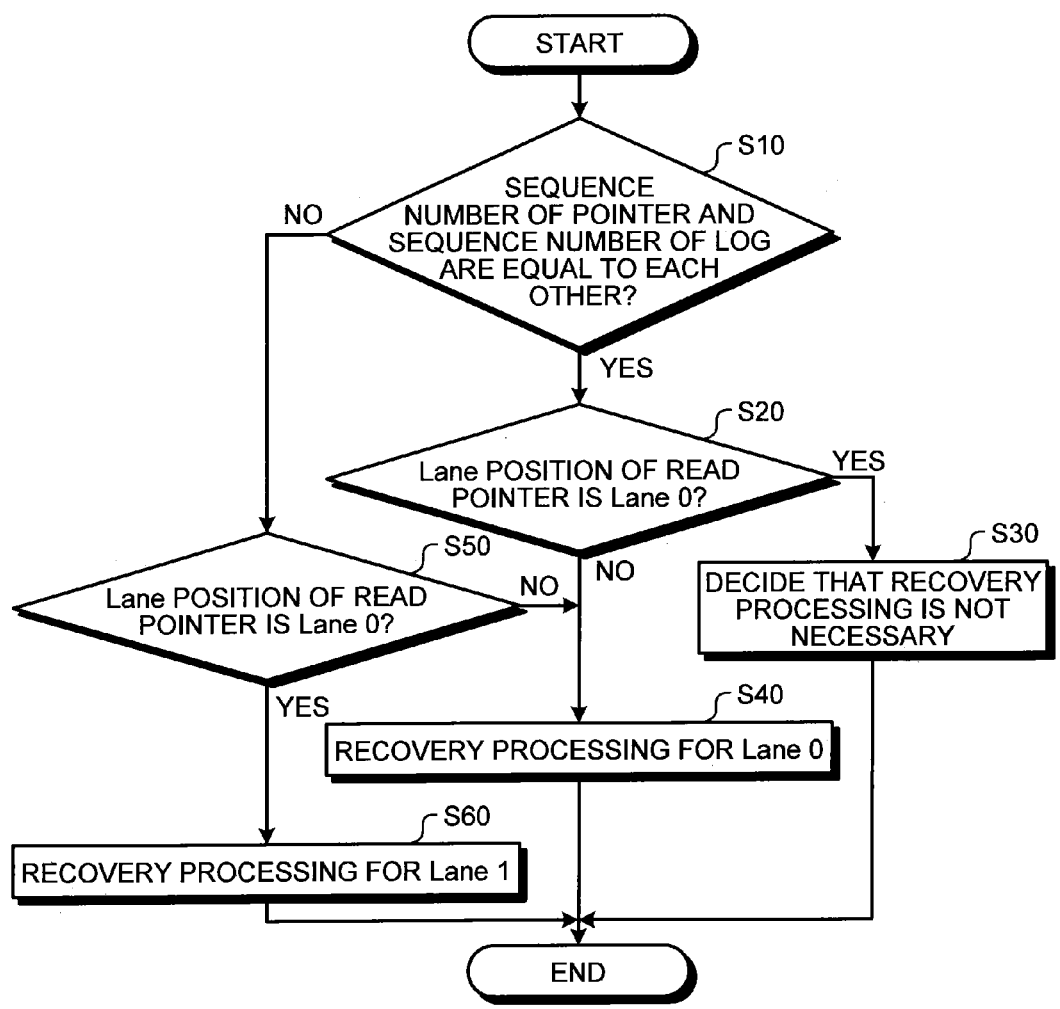
FIG. 6 is a flowchart illustrating a procedure for a processing of deciding any position in which a recovery processing is to be carried out.

FIG. 6 is a flowchart illustrating a procedure for a decision processing of deciding a position in which the recovery processing is to be carried out. The system managing section 32 decides whether a sequence number of a read pointer and that of a read log are equal to each other or not (Step S10).

If the sequence number of the pointer and that of the log are equal to each other (Step S10, Yes), the system managing section 32 decides whether a Lane position (a block number) of the pointer succeeding in the read is Lane 0 or not (Step S20).

If the Lane position of the pointer succeeding in the read is the Lane 0 (Step S20, Yes), the system managing section 32 decides that the recovery processing for the pointer and log information 4 is not required (Step S30).

If the Lane position of the pointer succeeding in the read is Lane 1 (Step S20, No), it is supposed that the Lane 0 is deteriorated. For this reason, the system managing section 32 carries out the recovery processing over the Lane 0 (Step S40). More specifically, a pointer stored in the Lane 1 (the block 2 or the block 3) is copied and rewritten to a new page of the Lane 0 (the blocks 0 and 1). At this time, the system managing section 32 does not need to carry out the recovery processing over the Lane 1 (the blocks 2 and 3). In this case, the pointer is saved in new pages of the blocks 0 and 1, and the new pages of the blocks 2 and 3 are maintained in an unwriting state (an erased page).

After rewriting the pointer to the Lane 0 in the recovery processing, the system managing section 32 writes, to the pointer and log information 4, a new log corresponding to the completion of the rewrite of the pointer to the blocks 0 and 1. At this time, the new log is multiplexed through the write to all of the blocks 0 to 3.

For example, in the case in which the newest page is a page X (X is a natural number) and the log B1 is written, the pointer A1 is written to the second newest page (X−1). In this case, a pointer A2 having the same content as the pointer A1 is written to a page (X+1) (recovery processing). Moreover, a new log B2 is written to a page (X+2). At this time, a sequence number of the pointer A2 to be written to the page (X+1) as the recovery processing is set to be the same number as the sequence number of the pointer A1 written to the page (X−1). Moreover, a sequence number of the new log B2 to be written to the page (X+2) is set to be the same number as the sequence number of the log B1 written to the page X.

If the sequence number of the pointer is different from that of the log(the sequence number of the log B1 is older) (Step S10, No), the system managing section 32 decides whether the Lane position of the pointer succeeding in the read is Lane 0 or not (Step S50). If the Lane position of the pointer succeeding in the read is Lane 1 (Step S50, No), a power supply is disconnected immediately before the log is written and it is supposed that the Lane 0 is deteriorated. For this reason, the system managing section 32 carries out the recovery processing over the Lane 0 (Step S40).

If the sequence number of the pointer is different from that of the log and the Lane position of the pointer succeeding in the read is the Lane 0 (Step S50, Yes), moreover, it is supposed that the power supply is disconnected in the middle of the write of the pointer to the Lane 1. For this reason, the system managing section 32 carries out the recovery processing over the Lane 1 (Step S60).

After the Steps S30, S40 and S60, the memory system is started. The memory system is operated while updating the management table, the log on the DRAM, the pointer and log information 4, the management information, the user data, and the like.

Figures 7, 8:
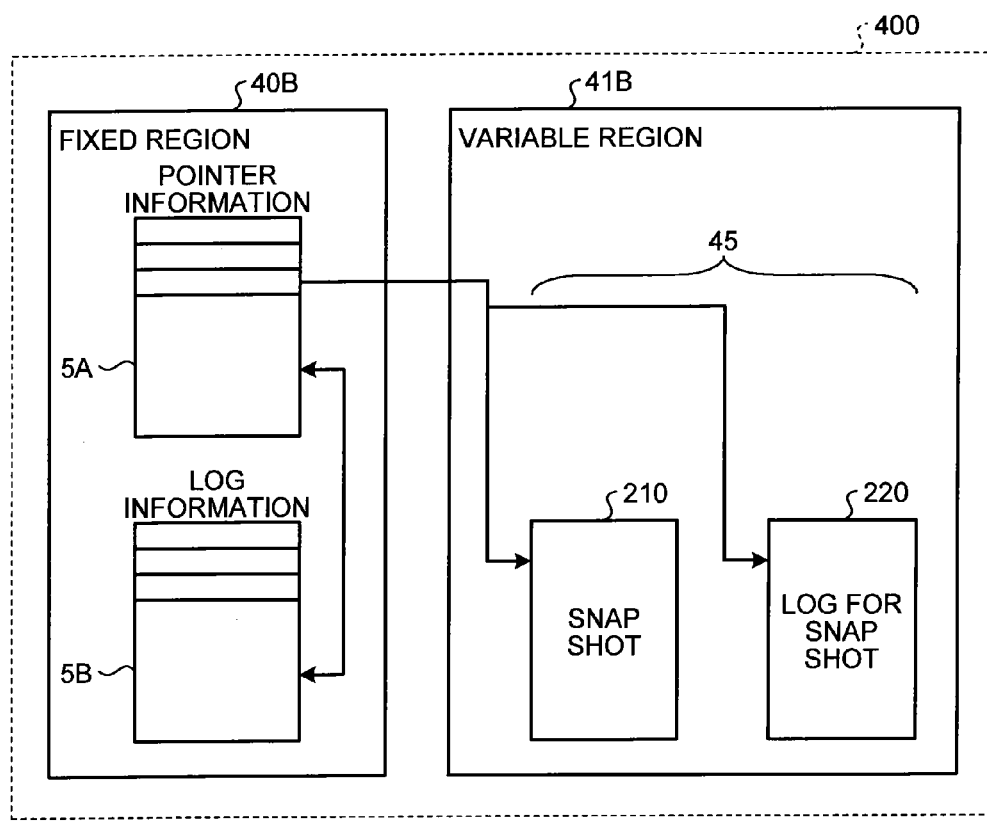
FIG. 7 is a table illustrating a result of the processing of deciding any position in which the recovery processing is to be carried out.
FIG. 8 is a diagram schematically illustrating positions in which pointer information and log information are to be stored according to a second embodiment.

FIG. 7 is a table illustrating a result of the decision processing of deciding any position in which the recovery processing is to be carried out. If the sequence number of the read pointer A1 is the same as that of the read log B1 (YES) and the Lane position of the read pointer A1 is the Lane 0, it is decided that the recovery processing is not required (D1).

If the sequence number of the read pointer A1 is the same as that of the read log B1 (YES) and the Lane position of the read pointer A1 is the Lane 1, it is decided that the recovery processing is to be carried out by taking the Lane 0 as a target (D2).

If the sequence number of the read pointer A1 is different from that of the read log B1 (NO) and the Lane position of the read pointer A1 is the Lane 0, it is decided that the recovery processing is to be carried out by taking the Lane 1 as a target (D3).

If the sequence number of the read pointer A1 is different from that of the read log B1 (NO) and the Lane position of the read pointer A1 is the Lane 1, it is decided that the recovery processing is to be carried out by taking the Lane 0 as a target (D4).

The system managing section 32 may decide the necessity of the recovery processing based on the write success or failure information in the log if the data read from the newest page are the log. In this case, the recovery processing is carried out over the Lane including the block in which it is indicated that the write fails in the write success or failure information.

Moreover, the system managing section 32 may decide the necessity of the recovery processing based on the Lane position in which the pointer can be read if the data read from the newest page are the pointer.

In this case, the system managing section 32 decides whether the data read from the newest page are the pointer A1 or not based on the pointer/log decision flag in the data read from the newest page. In this case, moreover, the system managing section 32 reads the pointer from all of the blocks. If the system managing section 32 decides that the data read from the newest page are the pointer, it confirms the Lane position from which the pointer can be read. If the Lane position of the pointer succeeding in the read is only the Lane 0, the system managing section 32 decides that the recovery processing is to be carried out by taking the Lane 1 as a target. On the other hand, if the Lane position of the pointer succeeding in the read is only the Lane 1, the system managing section 32 decides that the recovery processing is to be carried out by taking the Lane 0 as a target.

Although the data decision as to whether the data read from the pointer and log information 4 are the pointer or the log is made based on the pointer/log decision flag in the present embodiment, the data decision may be made based on a sequence number. In this case, if a sequence number of the data read from the newest page is different from that of data read from the second newest page, it is decided that the data on the newest page are the pointer and the data on the second newest page are the log.

In the present embodiment, moreover, the pointer indicative of the position in which the management information is to be stored may be set to be the pointer in a plurality of stages. For example, in the case in which the pointer is set into two stages, the pointer to be stored in the fixed region 40A is set to be a first route pointer. The first route pointer indicates a position (a block) in which a second route pointer is to be stored, and the second route pointer indicates a position (a block) in which the management information is to be stored. The first route pointer is updated when the block in which the second route pointer is to be stored is changed. Moreover, the first route pointer and the second route pointer are stored in different blocks from each other. For this reason, the second route pointer may be saved in the fixed region 40A or the variable region 41A.

Although the description has been given to the case in which the recovery processing is carried out over either the Lane 0 or the Lane 1 in the case in which any of the multiplexed pointers cannot be read in the present embodiment, furthermore, the recovery processing may be carried out over both the Lane 0 and the Lane 1. In this case, the newest page number in which the pointer or the log is to be stored can be set to be identical between the Lanes. In the case in which any of the multiplexed pointers cannot be read, moreover, the recovery processing may be carried out over only the block which cannot be read.

Although the description has been given to the case in which both the pointer and the log are multiplexed and stored in the NAND memory 10 in the present embodiment, moreover, it is also possible to multiplex only the pointer and to store the log in the NAND memory 10 without multiplexing.

According to the first embodiment, thus, the log of the pointer is saved. In the case in which the multiplexing number of the pointer to be multiplexed and stored is insufficient, therefore, it is possible to easily execute a processing of deciding any position in which the recovery processing is to be carried out when the multiplexing of the pointer is subjected to the recovery processing. Consequently, it is possible to easily maintain the multiplexing of the pointer. As a result, it is possible to easily enhance a reliability of a data storage. Since the pointer and the log are multiplexed and stored, it is possible to prevent the system during power-on sequence from being disabled.

Second Embodiment

Next, a second embodiment according to the present invention will be described with reference to FIGS. 8 to 11. In the second embodiment, a pointer and a log of the pointer are saved separately in a fixed region.

FIG. 8 is a diagram schematically illustrating positions in which pointer information and log information are to be stored according to the second embodiment. Some of components in FIG. 8 which achieve the same functions as in the management information saving region 400 according to the first embodiment illustrated in FIG. 2 have the same reference numerals, and repetitive description will be omitted.

In an NAND memory 10, a management information saving region 400 saving management information 45, pointer information 5A and log information 5B therein has a fixed region 40B and a variable region 41B. The fixed region 40B is the same as the fixed region 40A described in the first embodiment, and pointer information 5A and log information 5B are stored therein. The variable region 41B is the same as the variable region 41A described in the first embodiment, and the management information 45 is stored therein. In the present embodiment, the pointer information 5A and the log information 5B are stored separately in the fixed region 40B. The pointer information 5A has a pointer such as a pointer A1 stored in time series, and the log information 5B has a log such as a log B1 stored in time series.

Next, description will be given to a method of saving the pointer information 5A and the log information 5B. FIG. 9 is a diagram illustrating an example of structures of the pointer information and the log information according to the second embodiment. The pointer information 5A is saved in the fixed region 40B by using Lane 0 constituted by blocks 0 and 1 and Lane 1 constituted by blocks 2 and 3, for example. Moreover, the log information 5B is saved in the fixed region 40B by using Lane 2 constituted by blocks 4 and 5 and Lane 3 constituted by blocks 6 and 7, for example.

The same pointer is copied and saved in the blocks 0 to 3 of the pointer information 5A. For example, in the case in which a pointer to be stored at a first time is a pointer C1, the pointer C1 is saved in pages 0 of the blocks 0 to 3 respectively. In the case in which a pointer to be subsequently stored is a pointer C2, the pointer C2 is saved in pages 1 of the blocks 0 to 3 respectively.

Furthermore, the same log is copied and saved in the blocks 4 to 7 of the log information 5B. For example, in the case in which a log to be stored at a first time is a log D1, the log D1 is saved in pages 0 of the blocks 4 to 7 respectively. In the case in which a log to be subsequently stored is a pointer D2, the log D2 is saved in pages 1 of the blocks 4 to 7 respectively.

Next, description will be given to an example of a content of information to be stored in the pointer and an example of a content of information to be stored in the log. FIGS. 10A and 10B are tables illustrating a content of the pointer and a content of the log according to the second embodiment. FIG. 10A illustrates an example of a structure of the pointer and FIG. 10B illustrates an example of a structure of the log. Referring to the same components in FIGS. 10A and 10B as the pointer or the log according to the first embodiment illustrated in FIGS. 4A and 4B, repetitive description will be omitted.

As illustrated in FIG. 10A, the pointer is constituted in a correspondence of information indicative of a position (an offset position) from a head of information of the pointer and a content of the information. A sequence number indicative of the number of updating times of the pointer is stored in a position (a head) of "0" from the head of the information. Moreover, the pointer to the management information 45 (information indicative of a storage position in the NAND memory 10) is stored in a position of "1" from the head of the information.

As illustrated in FIG. 10B, moreover, the log is constituted in a correspondence of information indicative of a position (an offset position) from a head of information of the log and a content of the information. A sequence number indicative of the number of updating times of the log(pointer) is stored in a position (a head) of "0" from the head of the information. Furthermore, information (write success or failure information) indicating whether page write to each block succeeds or fails is stored in positions after the position of "1" from the head of the information.

Figure 11:
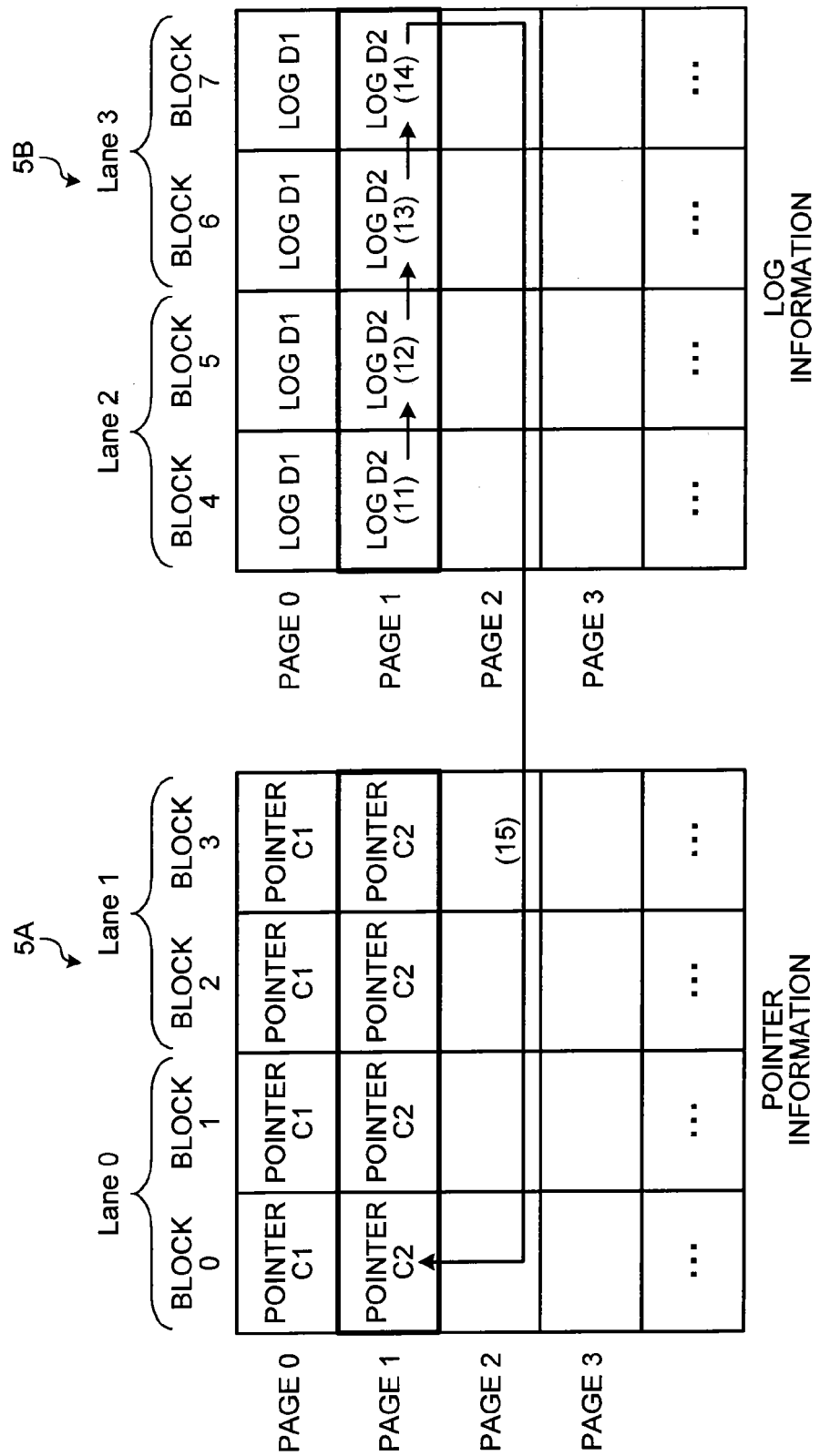
FIG. 11 is a diagram for explaining a procedure for reading the pointer and the log according to the second embodiment.

Next, description will be given to a procedure for reading a pointer and a log. FIG. 11 is a diagram for explaining the procedure for reading a pointer and a log according to the second embodiment. Referring to the same processing as the processing of reading the pointer A1 and the log B1 according to the first embodiment described with reference to FIG. 5, repetitive description will be omitted.

When the pointer C2 and the log D2 are to be read, the log D2 is read from an inside of the log information 5B and the pointer C2 is then read from an inside of the pointer information 5A. When the log D2 is to be read from the log information 5B, a block managing section 31 extracts the log information 5B from an inside of the NAND memory 10 and transmits the log information 5B to a system managing section 32.

The system managing section 32 retrieves a page (the newest page) updated finally from the blocks 4 to 7 in the log information 5B. The system managing section 32 reads a log of the page in order from a block having a smaller block number until the read succeeds. Herein, the log D2 in a page 1 to be the newest page is read in order of the block 4, the block 5, the block 6 and the block 7.

The system managing section 32 reads data from a page having the same page number in the block 5 if data read from the block 4 fails so that the read cannot be carried out. Subsequently, a processing of carrying out a movement through the block to read the page having the same page number is repeated until the read can be performed.

If the log D2 can be read from any of the blocks 4 to 7, a processing of reading the pointer C2 is carried out. When the pointer C2 is to be read from the pointer information 5A, the block managing section 31 extracts the pointer information 5A from the inside of the NAND memory 10 and transmits the pointer information 5A to the system managing section 32.

The system managing section 32 reads the write success or failure information for each block which is stored in the log D2. Then, the system managing section 32 reads a pointer from a proper block (a block succeeding in write) by referring to the write success or failure information thus read. At this time, the system managing section 32 reads data (the pointer C2) from the newest page (the page 1) of the block succeeding in the read (15).

If the system managing section 32 can decide that the pointer A1 is successfully written to the blocks based on the write success or failure information, it reads data from the newest page (the page 1) of any of the blocks succeeding in the write which has the smallest block number. If the read fails, the processing of reading the pointer C2 from the page 1 in a next block in ascending order of the block number is repeated until the read succeeds. The system managing section 32 decides the necessity of the recovery processing based on the read log D2 and the read pointer C2. In the present embodiment, there is executed a processing of deciding any position in which the recovery processing is to be carried out by the same method as that in the first embodiment described with reference to FIG. 6.

Also in the case in which the NAND memory 10 is constituted by a multivalued memory, it is desirable that the fixed region 40B should be used in a binary mode in order to enhance a reliability of the data of the pointer information 5A.

According to the second embodiment, thus, the pointer information and the log information are saved separately. Therefore, it is possible to easily carry out the processing of reading the newest log and the processing of reading the newest pointer.

Third Embodiment

Next, a third embodiment according to the present invention will be described with reference to FIGS. 12 to 15. In the third embodiment, pointer information is saved in a fixed region and log information is saved in a variable region.

Figure 12:
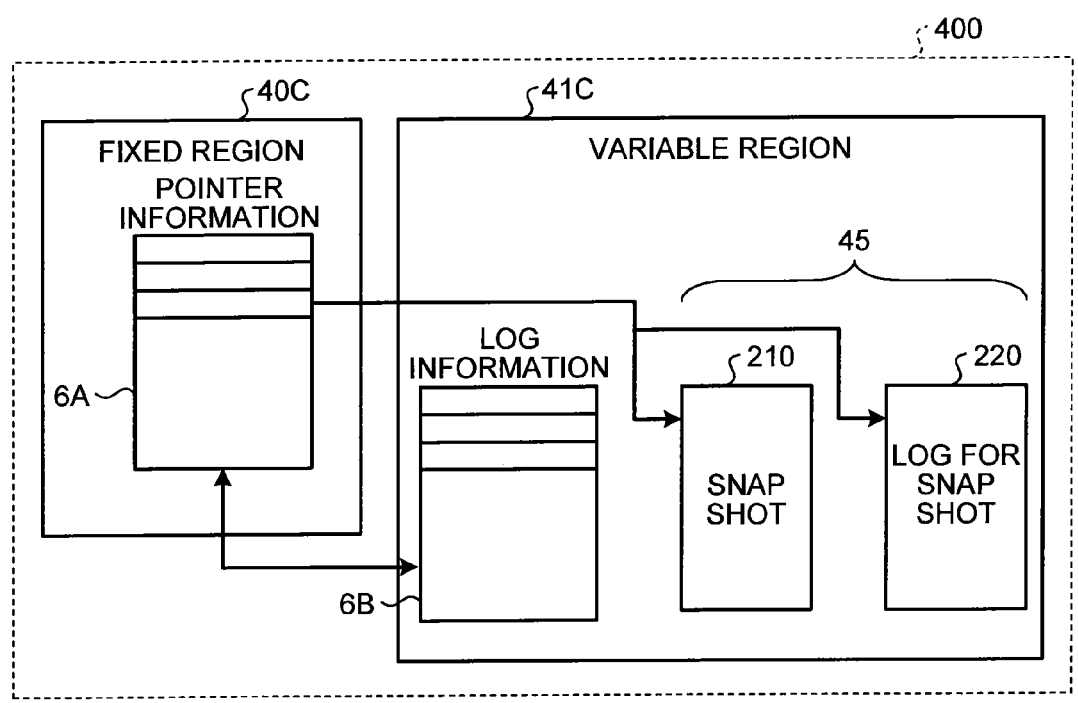
FIG. 12 is a diagram schematically illustrating positions in which pointer information and log information are to be stored according to a third embodiment.

FIG. 12 is a diagram schematically illustrating positions in which pointer information and log information are to be stored according to the third embodiment. Components in FIG. 12 which achieve the same functions as those of the management information saving region 400 according to the first or second embodiment of FIG. 2 or 8 have the same numbers, and repetitive description will be omitted.

In an NAND memory 10, a management information saving region 400 saving management information 45, pointer information 6A and log information 6B therein has a fixed region 40C and a variable region 41C. The fixed region 40C is the same as the fixed region 40A or 40B described in the first or second embodiment, and pointer information 6A is stored therein. The variable region 41B is the same as the variable region 41A or 41B described in the first or second embodiment, and the management information 45 and the log information 6B are stored therein.

In the present embodiment, the pointer information 6A is stored in the fixed region 40C and the log information 6B is stored in the variable region 41C. Consequently, the pointer information 6A and the log information 6B are stored separately. The pointer information 6A is the same as the pointer information 5A, and the log information 6B is the same as the log information 5B.

Figure 13:
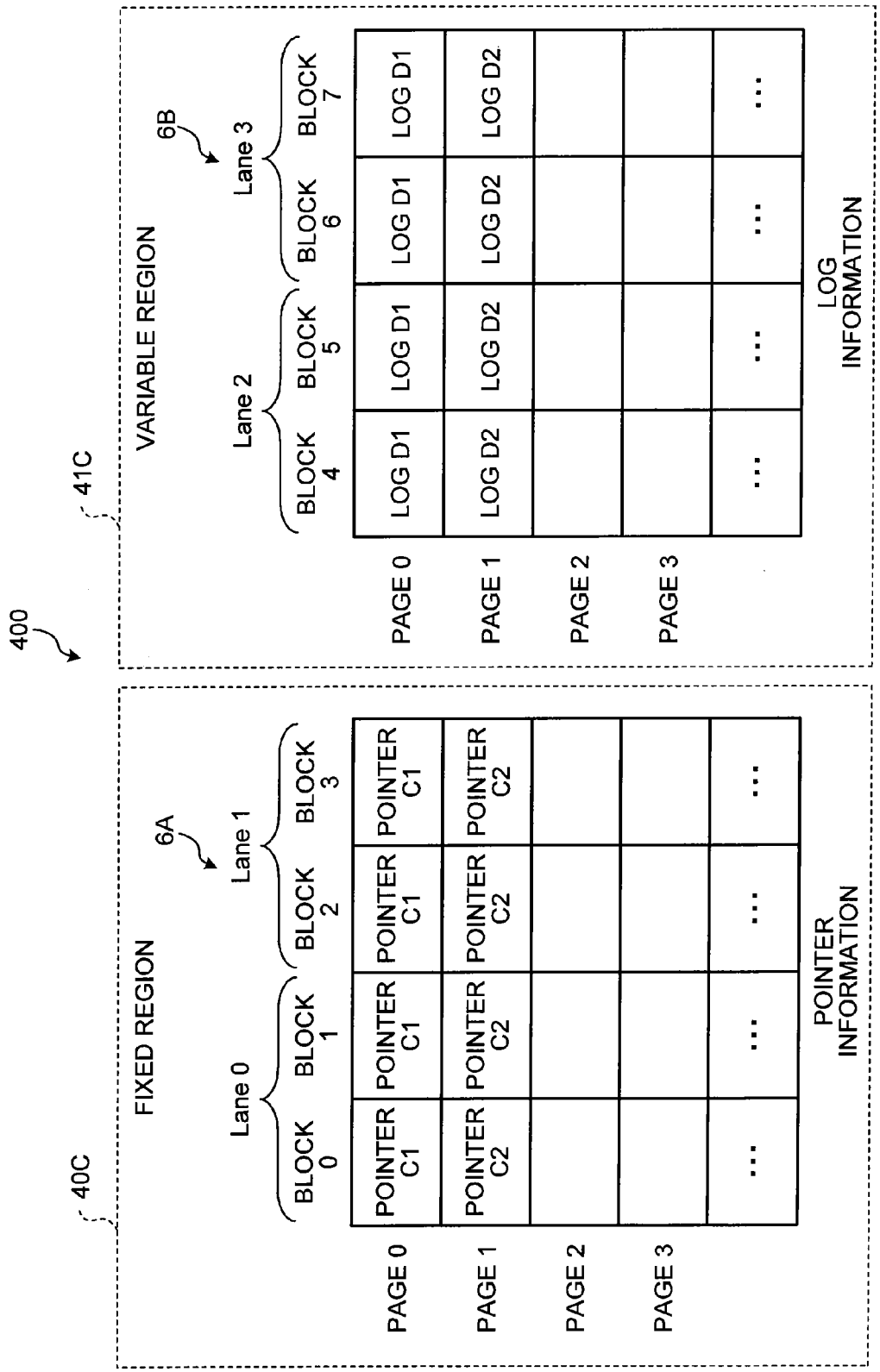
FIG. 13 is a diagram illustrating an example of structures of the pointer information and the log information according to the third embodiment.

Next, description will be given to a method of saving the pointer information 6A and the log information 6B. FIG. 13 is a diagram illustrating an example of structures of the pointer information and the log information according to the third embodiment. The pointer information 6A is saved in the fixed region 40C by using Lane 0 constituted by blocks 0 and 1 and Lane 1 constituted by blocks 2 and 3, for example. Moreover, the log information 6B is saved in the variable region 41C by using Lane 2 constituted by blocks 4 and 5 and Lane 3 constituted by blocks 6 and 7, for example. The same pointer is copied and saved in the blocks 0 to 3 of the pointer information 6A. Furthermore, the same log is copied and saved in the blocks 4 to 7 of the log information 6B.

For example, the pointer information 6A is updated after the management information 45 is read so that the block managing section 31 is initialized to be operable. The reason is that the pointer information 6A is not updated until the memory system is started to be usable and write of user data is generated to update the management information 45. After the block managing section 31 is operable, a block is dynamically assigned by using a wear leveling (leveling of the number of write/erase operations (the number of rewrite operations) on a block unit) mechanism which is possessed by the block managing section 31. In other words, the log information 6B is recorded on the block assigned dynamically in consideration of the wear leveling.

The block managing section 31 selects a free block having the smallest number of rewriting operations when writing update data as a wear leveling processing, for example. Alternatively, the block managing section 31 exchanges data stored in the block having the smallest number of rewriting operations with data stored in a block having the largest number of rewriting operations as the wear leveling processing, for example. Thus, it is possible to carry out the leveling of the number of rewriting operations in the whole block included in the NAND memory 10. In the present embodiment, the fixed region 40C is not intended for the wear leveling but the variable region 41C is intended for the wear leveling.

Since information to be stored in the pointer and information to be stored in the log are the same as the information described in the second embodiment, description thereof will be omitted. Since a procedure for reading the pointer and the log is the same as the procedure described in the second embodiment, moreover, description thereof will be omitted. Since a processing of deciding any position in which a recovery processing is to be carried out is executed by the same method as in the first embodiment, furthermore, description thereof will be omitted.

In the present embodiment, the block managing section 31 has information about a storage position for the log information 6B. During power-on sequence of the system, the block managing section 31 extracts the log information 6B based on the information about the storage position for the log information 6B and transmits the log information 6B to the system managing section 32.

In the present embodiment, thus, the pointer information 6A is saved in the fixed region 40C and the log information 6B is saved in the variable region 41C. For this reason, it is possible to decrease an amount of data to be written to the fixed region 40C and to minimize a use of a block to be assigned statically. In other words, by recording the log information 6B on the block assigned dynamically, it is not necessary to statically assign the block separately for the log information 6B. Thus, it is not necessary to statically ensure the block for the log information 6B. Consequently, the number of the blocks which can be dynamically ensured by using the wear leveling mechanism increases. Accordingly, it is possible to ensure a large memory capacity to be used freely as the memory system.

Moreover, the log information 6B is stored in the variable region 41C. Therefore, an exhaustion of the block in the fixed region 40C does not advance quickly in order to record the log information 6B. Consequently, it is possible to prevent a deterioration in the block constituting the fixed region 40C.

By not storing the log information 6B in the fixed region 40C, furthermore, it is possible to reduce a risk that important information cannot be read. The reason is that the block ensured statically is not intended for the wear leveling, and the same block is used many times if much information is stored in the fixed region 40C.

Also in the case in which the NAND memory 10 is constituted by the multivalued memory, it is desirable that the fixed region 40C should be used in a binary mode in order to enhance a reliability of data of the pointer information 5A.

According to the third embodiment, thus, the log information 6B is stored in the variable region 41C. Therefore, it is possible to suppress a reduction in a lifetime of the memory system and to efficiently use the NAND memory 10.

Fourth Embodiment

Figure 14:
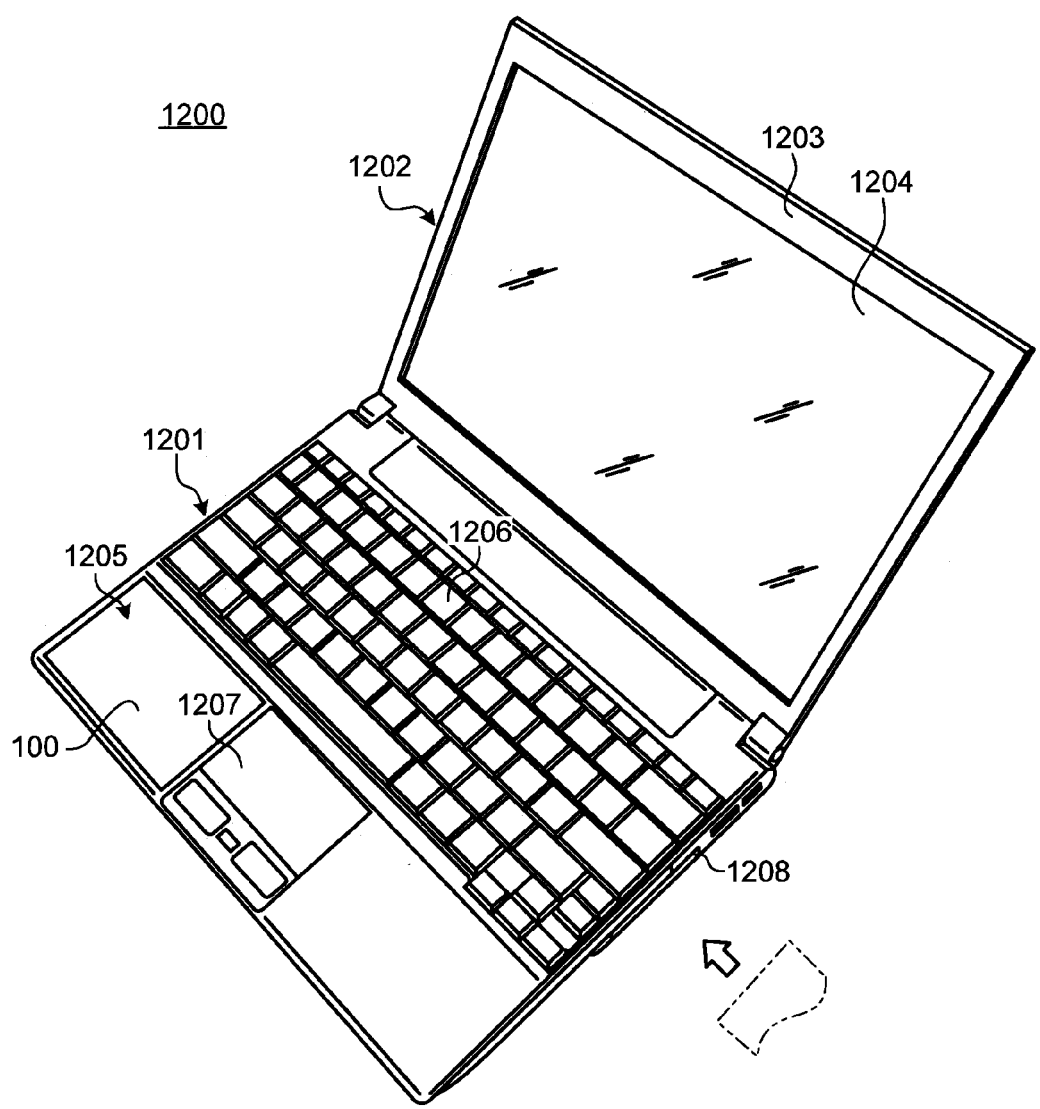
FIG. 14 is a perspective view illustrating an example of a personal computer provided with an SSD.

FIG. 14 is a perspective view illustrating an example of a personal computer provided with an SSD 100. A personal computer 1200 includes a body 1201 and a display unit 1202. The display unit 1202 has a display housing 1203 and a display device 1204 accommodated in the display housing 1203.

The body 1201 includes a housing 1205, a keyboard 1206, and a touch pad 1207 to be a pointing device. A main circuit board, an ODD (optical disk device) unit, a card slot, the SSD 100 and the like are accommodated in the housing 1205.

The card slot is provided adjacently to a peripheral wall of the housing 1205. The peripheral wall is provided with an opening portion 1208 opposed to the card slot. A user can insert/remove an additional device to/from the card slot at an outside of the housing 1205 through the opening portion 1208.

The SSD 100 may be used in a mounting condition in the personal computer 1200 for a replacement with the conventional HDD or may be used as an additional device in an inserting condition to the card slot provided in the personal computer 1200.

Figure 15:
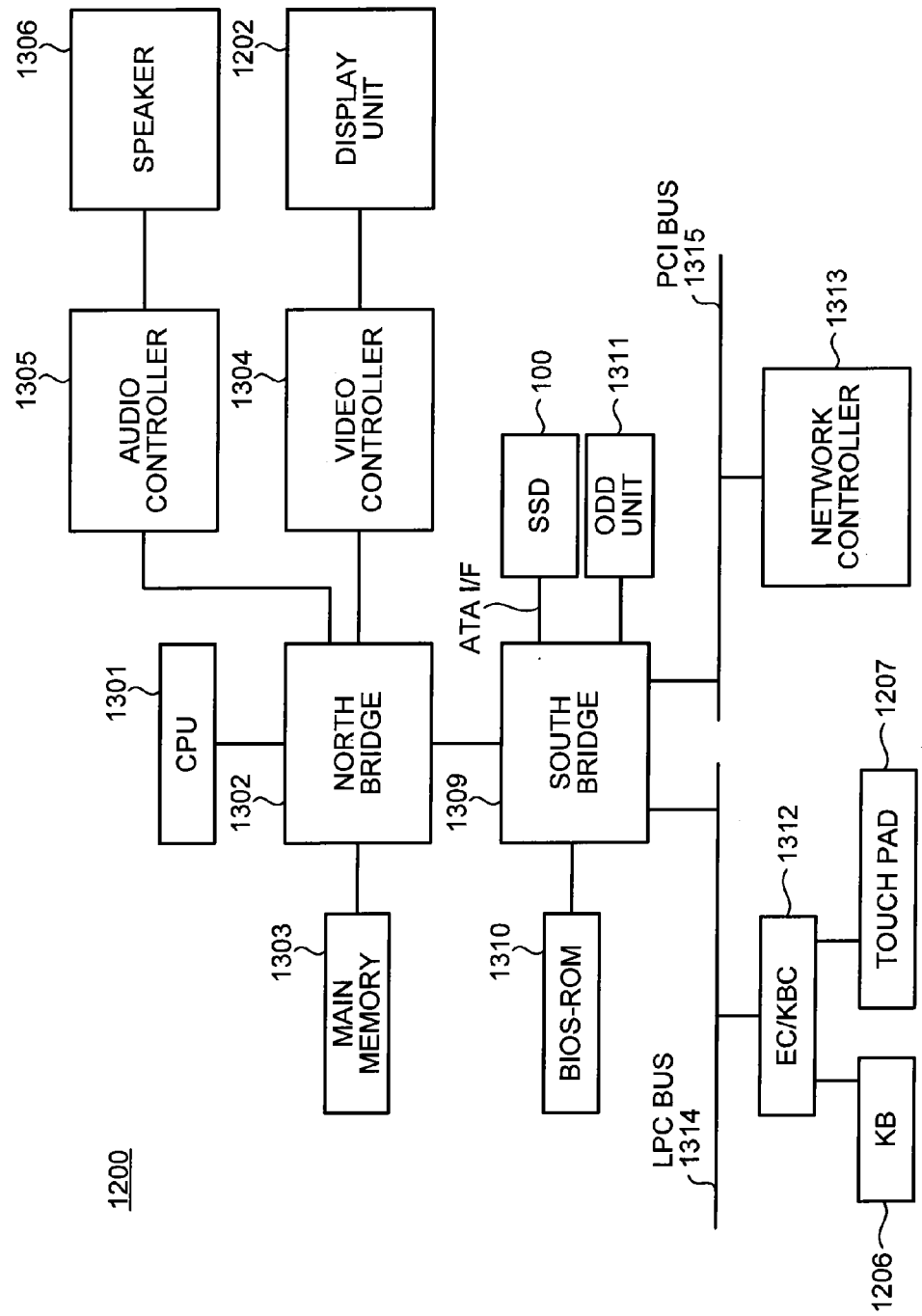
FIG. 15 is a diagram illustrating an example of a structure of a system in the personal computer provided with the SSD.

FIG. 15 illustrates an example of a structure of a system in a personal computer provided with an SSD. The personal computer 1200 includes a CPU 1301, a north bridge 1302, a main memory 1303, a video controller 1304, an audio controller 1305, a south bridge 1309, a BIOS-ROM 1310, the SSD 100, an ODD unit 1311, an embedded controller/keyboard controller IC (EC/KBC) 1312, a network controller 1313, and the like.

The CPU 1301 is a processor provided for controlling an operation of the personal computer 1200, and executes an operating system (OS) to be loaded from the SSD 100 to the main memory 1303. In the case in which the ODD unit 1311 can execute at least one of a read processing and a write processing with respect to an optical disk which is provided, furthermore, the CPU 1301 executes the processings.

Moreover, the CPU 1301 also executes a system BIOS (Basic Input Output System) stored in the BIOS-ROM 1310. The system BIOS is a program for a hardware control in the personal computer 1200.

The north bridge 1302 is a bridge device for connecting a local bus of the CPU 1301 to the south bridge 1309. The north bridge 1302 also includes a memory controller for access controlling the main memory 1303.

Furthermore, the north bridge 1302 also has a function for executing a communication with the video controller 1304 and a communication with the audio controller 1305 through an AGP (Accelerated Graphics Port) bus or the like.

The main memory 1303 temporarily stores a program or data and functions as a work area of the CPU 1301. The main memory 1303 is constituted by a DRAM, for example.

The video controller 1304 is a video playback controller for controlling the display unit 1202 to be used as a display monitor of the personal computer 1200.

The audio controller 1305 is an audio playback controller for controlling a speaker 1306 of the personal computer 1200.

The south bridge 1309 controls each device on an LPC (Low Pin Count) bus 1314 and each device on a PCI (Peripheral Component Interconnect) bus 1315. Moreover, the south bridge 1309 controls, through an ATA interface, the SSD 100 to be a storage device for storing various software and data.

The personal computer 1200 gives access to the SSD 100 on a sector unit. A write command, a read command, a flash command or the like is input to the SSD 100 through the ATA interface (I/F).

Moreover, the south bridge 1309 also has a function for access controlling the BIOS-ROM 1310 and the ODD unit 1311.

The EC/KBC 1312 is a one-chip microcomputer in which an embedded controller for a power management and a keyboard controller for controlling the keyboard (KB) 1206 and the touch pad 1207 are integrated.

The EC/KBC 1312 has a function for turning ON/OFF the personal computer 1200 depending on an operation of a power button by a user. The network controller 1313 is a communication device for executing a communication with an external network such as Internet.

The personal computer 1200 supplies a power to the SSD 100, and moreover, issues a request for stop (a Standby request) to the SSD 100. Even if the supply of the power from the personal computer 1200 to the SSD 100 is disconnected unfairly, it is possible to prevent an occurrence of an error that the system cannot be started.

According to the first to fourth embodiments, thus, it is possible to easily enhance the reliability of a data storage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller for controlling a data transfer between the nonvolatile memory and a host device,
wherein the controller writes, to the nonvolatile memory, management information indicating relationships between logical addresses designated by the host device and physical addresses in the nonvolatile memory,
writes, to the nonvolatile memory, a pointer indicating a storage position of the management information,
writes, to the nonvolatile memory, a log indicating whether the writing of the pointer is successful,
multiplexes the pointer by a predetermined number and writes the multiplexed pointers to the nonvolatile memory,
determines whether the multiplexing the pointer by the predetermined number is maintained according to at least one of the pointer and the log, and
rewrites the multiplexed pointers to the nonvolatile memory when determining that the multiplexing the pointer by the predetermined number is not maintained.

2. The memory system according to claim 1, wherein the controller multiplexes the log by the predetermined number and writes the multiplexed logs to the nonvolatile memory.

3. The memory system according to claim 1, wherein the controller writes the pointer to a fixed region to which the relationships are statically assigned.

4. The memory system according to claim 3, wherein the controller writes the log to the fixed region.

5. The memory system according to claim 3, wherein the controller writes the log to a variable region to which the relationships are dynamically assigned.

6. The memory system according to claim 1, wherein
the nonvolatile memory includes a plurality of blocks, each of the plurality of blocks is a data erasing unit, and
the controller writes the multiplexed pointers to different blocks from each other.

7. The memory system according to claim 6, wherein
each of the plurality of blocks includes a plurality of pages, each of the plurality of pages is a data writing unit, and
the controller writes the multiplexed pointers to identical page position of the different blocks from each other.

8. The memory system according to claim 6, wherein the controller detects the newest pages of the blocks and continuously verifies the respective newest page until at least one of the multiplexed pointers is successfully read.

9. The memory system according to claim 2, wherein
the nonvolatile memory includes a plurality of blocks, each of the plurality of blocks is a data erasing unit, and
the controller writes the multiplexed logs to the different blocks from each other.

10. The memory system according to claim 9, wherein
each of the plurality of blocks includes a plurality of pages, each of the plurality of pages is a data writing unit, and
the controller writes the multiplexed logs to identical page position of the different blocks from each other.

11. The memory system according to claim 4, wherein the controller writes the pointer to a first block and writes the log to a second block different from the first block in the fixed region.

12. The memory system according to claim 1, wherein the pointer and the log include flag information respectively for discriminating between the pointer and log, and
the controller determines whether the multiplexing the pointer by the predetermined number is maintained based on the flag information.

13. The memory system according to claim 6, wherein the pointer and the log include sequence numbers respectively, and
the controller verifies whether the sequence number of the pointer and that of the log are coincident with each other or not.

14. The memory system according to claim 13, wherein the controller selects the block for rewriting the pointer in order to maintain the predetermined number of multiplexing based on a storage position of the pointer read successfully and the sequence number.

15. The memory system according to claim 1, wherein the multiplexing the pointer by the predetermined number is duplicating operation.

16. The memory system according to claim 1, wherein the multiplexing the pointer by the predetermined number is quadruplicating operation.

17. The memory system according to claim 1, further comprising a volatile memory, wherein
the controller acquires the management information from the nonvolatile memory based on the pointer and writes at least a part of the management information to the volatile memory during power-on sequence of the memory system.

18. The memory system according to claim 17, wherein the volatile memory is a DRAM (Dynamic Random Access Memory).

19. The memory system according to claim 17, wherein the volatile memory is an SRAM (Static Random Access Memory).

20. The memory system according to claim 1, wherein the nonvolatile memory is an NAND type flash memory.

\* \* \* \* \*